United States Patent [19]

Williams et al.

[11] Patent Number: 4,562,612
[45] Date of Patent: Jan. 7, 1986

[54] FLUID-DRIVEN TRANSDUCER VACUUM TOOL

[76] Inventors: Raymond F. Williams, P.O. Box 488, Bolivar, Ohio 44612; William H. Smith, 1337 Highbrook St., Akron, Ohio 44301

[21] Appl. No.: 527,071

[22] Filed: Aug. 29, 1983

[51] Int. Cl.⁴ .............................................. A47L 5/14
[52] U.S. Cl. ........................................ 15/409; 417/76
[58] Field of Search ............................. 15/409; 417/76

[56] References Cited

U.S. PATENT DOCUMENTS

| | | |
|---|---|---|
| 749,774 | 1/1904 | Cooper . |
| 1,180,960 | 4/1916 | Urie . |
| 1,276,683 | 8/1918 | Northwood . |
| 2,040,715 | 5/1936 | Smith . |
| 2,114,573 | 4/1938 | Rhodes . |
| 2,176,577 | 10/1939 | Tirrell . |
| 2,324,422 | 7/1943 | Patterson ............................ 15/409 |
| 2,421,806 | 6/1947 | Perry . |
| 2,856,205 | 10/1958 | Coleman et al. ................. 15/409 X |
| 2,937,802 | 5/1960 | Fisher ............................... 15/409 X |
| 3,323,257 | 6/1967 | Fonti . |
| 3,964,123 | 6/1976 | Pettersson ....................... 15/409 X |
| 3,982,605 | 9/1976 | Sneckberger . |
| 4,253,610 | 3/1981 | Larkin . |

FOREIGN PATENT DOCUMENTS 508152 6/1939 United Kingdom ................. 15/409

OTHER PUBLICATIONS

IPEC "The Eliminators", Coventry, R.I., 9-1982.
P&G Eliminator, Pauli and Griffin, S. San Francisco, Calif., Primary Examiner—Chris K. Moore
Attorney, Agent, or Firm—Michael Sand Co.

[57] ABSTRACT

A fluid-driven transducer vacuum tool is disclosed in the preferred embodiment. Pressurized liquid or compressed gas passes through a nozzle tip which is enclosed in a casting. Because the cavities leading to the nozzle tip are of increasingly smaller diameter, a drop in pressure is achieved by the increased velocity of the fluid. Thus, as the fluid leaves the nozzle tip, a vacuum is created which allows substances such as sand or other abrasives, rocks, or slurry to be pulled into the tool through the vacuum inlet. The vacuumed substances pass directly through the apparatus without harming it because the venturi casting of the tool contains a replaceable liner which prevents wear to the tool itself. Because the material can be pulled directly through the tool in this manner, an efficient, portable, and durable tool is provided. As the vacuumed substances are discharged from the apparatus, they can be expelled some distance away from the worksite or transferred to a container.

9 Claims, 1 Drawing Figure

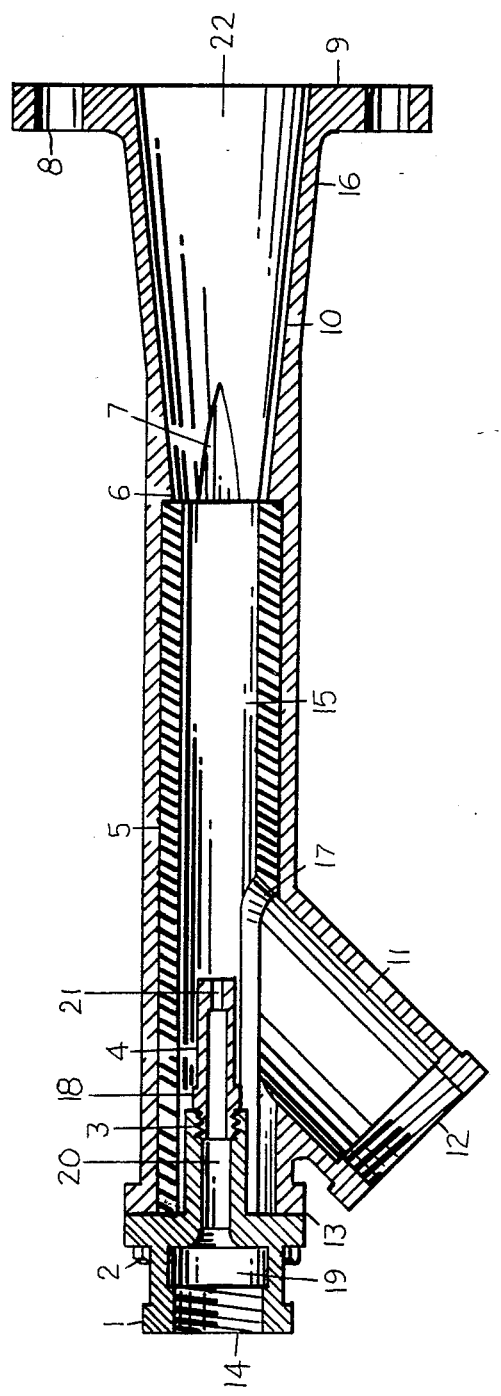

FLUID-DRIVEN TRANSDUCER VACUUM TOOL

BACKGROUND OF THE INVENTION

This invention relates to industrial equipment and specifically to an improved system for using vacuum energy which is either pnuematically- or hydraulically-produced for cleanup and material conveyance.

SUMMARY OF THE INVENTION

Heretofore, vacuum systems used in cleanup and material conveyance in factories or operations such as abrasive blasting were bulky, expensive, and self-destructive; and they required more compressed air or pressurized liquid than most contractors had available on job sites. A typical vacuum system of the previously mentioned type was quite large—often several thousand pounds—and required upwards of 250–600 CFM of air to operate. These machines also cost so much that they were impractical for most contractors. Furthermore, these systems were not as adaptable to a variety of situations or as portable as would be desired due to their size. Further, abrasive materials could not be pulled through the vacuum unit itself because the sand or other abrasive medium would very quickly abrade the vacuum mechanism itself. This factor also dictated the complexity of the hookup system because abrasive materials had to be drawn off into holding equipment through additional hoses and ports.

Accordingly, several objects of my invention are here presented. First, my invention provides a vacuum tool that is very portable and can thus be used in a wide variety of situations and is adaptable to a wide range of uses, including cleanup of abrasive materials, tranfer of materials from one place to another, and discharge of materials away from the site. Secondly, I made provision for a vacuum unit that requires as little as 50 CFM of air, an amount most users of this unit would already have available for other air-operated tools they commonly use. Thirdly, I have provided a unit that is inexpensive compared to the prior art. Finally, my object is to provide a vacuum-producing unit that is capable of pulling abrasives directly through itself because I have provided a replaceable designed-wear part that protects the apparatus from destruction by the abrasives and is easy and inexpensive to replace. This feature is an advantage because it reduces cost of producing the unit and maintaining it, it increases portability, and it extends equipment life.

Further objects and advantages of my invention will become apparent from a consideration of the drawing and ensuing description thereof.

BRIEF DESCRIPTION OF DRAWING

FIG. 1 is a sectional view through the transducer of the present invention.

DETAILED DESCRIPTION OF THE INVENTION

Attention is first directed to the drawing where the numeral 1 identifies the nozzle casting. The nozzle casting 1 of malleable cast iron includes a set of threads at 14 which are standard pipe threads formed inside a cylindrical body. The threads 14 are formed to enable connection to a hose which delivers a pressurized fluid such as a compressed gas or pressurized liquid through the hose into the nozzle tip 4. The nozzle tip 4 connects to the nozzle casting 1 with pipe thread 3 which are part of the nozzle casting 1. These threads are machined in the nozzle casting 1. In this preferred embodiment, the nozzle tip 4 is made of machined steel. The nozzle tip 4 could also be a standard pipe nipple. The flange 13 is machined to fit snugly. The nozzle casting 1 incorporates an internal axial passage 19 which is wide and opens into a narrower passage 20. This narrow passage 20 opens into the internal cavity or bore 21 of the nozzle tip 4. This process of introducing the compressed gas or pressurized liquid into increasingly narrower chambers increases the velocity of the fluid as the pressure is decreased.

The second major segment of the invention is the venturi casting 16. This casting 16 is also malleable cast iron and includes a vacuum inlet 11 which is part of the venturi casting 16 and is a cylindrical projection inside which are pipe threads 12 at its exterior end to enable a vacuum hose to be attached to the apparatus. The vacuum hose provides a conduit for materials which are to be picked up and passed through the apparatus. To the vacuum hose can be attached any number of hand tools to aid in the cleanup or transfer process.

The venturi casting 16 encloses a replaceable liner 5 which rests on a liner land 6 which holds the liner 5 in place. A notch 7 is cast into the apparatus to allow for easy removal of the liner 5. The replaceable liner 5 may be ceramic, cast urethane, standard blast hose, or any other material which would be resistant to the abrasive quality of materials pulled through the apparatus. As a suggestion, and with regard to the preferred embodiment, an ideal liner would be constructed of ceramic, although the urethane would be useful in some applications. The liner 5 is a replaceable wear part which greatly lengthens the life of the apparatus and is a reason why the vacuum transducer tool can be compact and, thus, portable.

The replaceable liner 5 has an opening 17 to allow for the vacuumed substances to enter through the vacuum inlet 11. The opening 17 is sized to conform to the size of the vacuum inlet 11.

The venturi throat 15 is a cylindrical, axial opening cast through the center of the venturi casting 16 which opens into the diffuser 10. The diffuser 10 allows for discharge of any materials pulled through the apparatus and is shaped at an 8 degree angle outward. A pipe flange 9 is machined to allow standard fittings to be bolted to it at 8. The diffuser 10 also allows the decreased pressure achieved in the venturi throat 15 to return to normal atmospheric pressure. Thus, the discharged matter can be expelled into the open or transferred to a suitable container.

A noise muffler can be affixed to flange 9 or a push attachment could be attached to enable transfer of materials some distance away from the apparatus through a suitable conduit such as a standard vacuum hose.

Both the nozzle casting 1 and the venturi casting 16 are here of cast malleable iron. They may, however, be made of fabricated steel, cast of urethane, cast of other alloys, or made of spun steel.

The preferred embodiment of this invention suggests the fluid intake being 150 CFM of compressed air at 100 PSI with a 5/16" nozzle tip 4, and the vacuum will pull 14" of mercury; but the size of the apparatus could be modified to accommodate more or less pressure intake at 14 and to achieve more or less vacuum at 11. These changes would entail nozzle tip 4 inside diameter bore 21 and liner 5.

The foregoing discloses and describes the structure of the present apparatus. Its operation will become more readily apparent from the consideration of the description included below.

In operation, the fluid-driven transducer vacuum tool 5 is used by connecting it to a source of compressed or pressurized fluid (such as an air compressor) by attaching a hose connector to 14. A vacuum hose would then be connected at 12. When the compressed fluid is turned on, the fluid passes through the passages in the nozzle casting 1 at 19, 20, and 21. As the compressed fluid moves through the nozzle tip 4, its velocity has been increased, causing a drop in pressure inside the venturi throat 15. This pressure drop creates a jet flow stream which produces the vacuum necessary to pull materials through the vacuum inlet 11. The vacuumed material can then pass through the venturi throat 15 where it does not abrade the inside surface of the tool because of the liner which protects the apparatus.

The compressed or pressurized fluid and vacuumed materials then pass out of the tool through the diffuser 10 which allows for a gradual return to atmospheric pressure and where velocity is decreased to allow for efficient discharge of materials at 22.

At the flange 9 a number of different accessories can be attached which could aid in moving the materials away from the worksite, muffle the noise, or help to transfer materials to a suitable container.

While the invention has been described herein with references to various preferred embodiments, and specific examples, it is to be understood that various changes and modifications may be made by those skilled in the art without departing from the spirit and scope of the invention defined in the following claimed subject matter.

We claim:

1. A portable vacuum tool including:
   (a) a generally cylindrical-shaped casing having a central bore terminating in open ends;
   (b) a pressurized fluid nozzle mounted on one of the casing open ends and extending into the bore;
   (c) a vacuum inlet opening forming in the casing and communicating with the casing bore;
   (d) a diffuser formed in the other of the casing open ends;
   (e) a ceramic liner telescopically removably mounted within the bore and extending between the vacuum inlet opening and the diffuser; and
   (f) means for removably clamping the liner in a fixed position within the casing bore.

2. The vacuum tool defined in claim 1 in which the casing bore is flared outwardly at said other casing open end to form the diffuser.

3. The vacuum tool defined in claim 2 in which the casing bore at the diffuser flares outwardly at an angle of approximately 8°.

4. The vacuum tool defined in claim 2 in which an annular flange surrounds said other casing open end and is adapted to be connected to auxillary equipment.

5. The vacuum tool defined in claim 1 in which the liner clamping means includes a land located adjacent to the diffuser and projecting into the bore and a flange removably mounted on said one casing open end which clamps the liner against the land.

6. The vacuum tool defined in claim 5 in which the fluid nozzle is mounted in said one casing open end by the flange; and in which a source of compressed air is adapted to be connected to the clamping flange for discharge into the casing bore through the fluid nozzle.

7. The vacuum tool defined in claim 1 in which the liner is an open ended sleeve formed by a cylindrical-shaped wall having an opening formed in said wall which aligns with the vacuum inlet opening.

8. The vacuum tool defined in claim 1 in which the fluid nozzle extends in an axial direction within the casing bore; and in which the vacuum inlet opening communicates with the casing bore at an acute included angle.

9. The vacuum tool defined in claim 8 in which an outlet end of the fluid nozzle is located adjacent the vacuum inlet opening.

* * * * *